United States Patent [19]
Clark et al.

[11] 3,977,245
[45] Aug. 31, 1976

[54] DOWN HOLE APPARATUS FOR SENSING AND STORING VALUES OF PHYSICAL PARAMETERS

[75] Inventors: Kenneth K. Clark; James C. Harper, both of Tulsa, Okla.

[73] Assignee: Geophysical Research Corporation, Tulsa, Okla.

[22] Filed: Sept. 29, 1975

[21] Appl. No.: 617,292

Related U.S. Application Data
[63] Continuation-in-part of Ser. No. 569,945, April 21, 1975.

[52] U.S. Cl. ................................. 73/151; 340/18 P
[51] Int. Cl.² ......................................... E21B 47/06
[58] Field of Search............. 73/151, 152; 340/18 R, 340/18 P, 18 FM

[56] References Cited
UNITED STATES PATENTS

| | | | |
|---|---|---|---|
| 3,732,728 | 5/1973 | Fitzpatrick | 73/151 |
| 3,792,430 | 2/1974 | Niven, Jr. | 340/18 P |
| 3,810,387 | 5/1974 | Stancliff | 73/151 |

*Primary Examiner*—Jerry W. Myracle
*Attorney, Agent, or Firm*—Head, Johnson & Chafin

[57] ABSTRACT

Apparatus for digitally recording the value of pressure and temperature, or other parameters, in a borehole logging instrument. In one embodiment the values of the earth parameter are converted to an A.C. signal, the frequency of which is a function of the value of the parameter. Clock means are provided for presenting, at selected time intervals, voltage pulses of selected short time length. The A.C. signal is gated to a counter for the selected short interval of time, and the count of the counter becomes a measure of the parameter. Solid state memory means are provided, and the output of the counter in the form of binary bits is stored in the memory. Means are provided for retrieving the instrument and reading out of the memory the binary bits as stored.

21 Claims, 5 Drawing Figures

DOWN HOLE APPARATUS FOR SENSING AND STORING VALUES OF PHYSICAL PARAMETERS

CROSS-REFERENCE TO RELATED APPLICATION

This application is a continuation-in-part of my copending application, Ser. No. 569,945, entitled "GAUGE FOR REMOTELY INDICATING THE PRESSURE OF A SUBTERRANEAN FORMATION," filed Apr. 21, 1975. Application Ser. No. 569,945 is incorporated by reference into this application.

BACKGROUND OF THE INVENTION

1. Field of the Invention

This invention lies in the field of electrical logging apparatus. More specifically, it concerns electrical logging apparatus for use in deep boreholes wherein the signals generated by the instrument in relation to the earth parameters to be measured, are stored at selected intervals of time in a digital solid state memory.

When the series of measurements are completed the logging sonde is brought to the surface and the digital data stored in the memory is retrieved, converted to analog values and displayed or recorded for later processing.

2. Description of the Prior Art

In the prior art, logging measurements which were made by assembling an instrument, sensitive to a parameter of the earth, such as pressure or temperature, for example, placing it in a sealed capsule, and lowering it to a selected position in the borehole and left for a period of a selected number of hours or days. Such instruments have always been designed with analog recording means within the capsule, and generally use a sharp pointed stylus in contact with a metal sheet or chart, such that the stylus responsive to a sensor, sensitive to pressure or temperature, moves across the metal sheet, in one coordinate direction, while clock mechanism moves the metal sheet in a second coordinate direction.

Because of the limited size of such borehole instruments, the area, or coordinate dimensions, of the recording sheet or chart are so small that it becomes impossible to measure changes in the earth parameter smaller than some minimum value. There appears to be no way of making the stylus point sharper or the recording chart larger to improve this situation.

It becomes an important object of this invention, therefore, to provide a subsurface logging instrument which is self-contained, in which the earth parameter is converted to an electrical signal which is digitized and stored in a digital storage memory, so that when the instrument is brought to the surface, the successive values of the electrical signal which have been stored, can be retrieved electrically and displayed.

Alternately, the digitizing means can be installed at the surface, connected by conducting cable to the sensors in the sonde, to provide a continuously surface recording logging instrument.

SUMMARY OF THE INVENTION

It is a primary object of this invention to provide a subsurface, self-contained, self-powered, instrument which has sensors which are sensitive to earth parameters in a deep borehole and which provide electrical signals which vary in accordance with the variation of the values of the parameters. It is a further object to detect the electrical signals and convert them to digital values, which are stored in solid state memory apparatus in the instrument. It is a still further object to provide means to cause the instrument to make records of the selected parameters at time intervals, of selected magnitude, in the ranges of minutes, hours or days.

The parameters of pressure and temperature are the ones of most interest at the present time and, accordingly, means are provided in the logging instrument for converting these parameters to variable frequency electrical signals, the frequency of which is a function of the value of parameters. Means are provided for accepting at least two different parameters each creating electrical signals of different frequencies. Electronic switching means are provided, on command, to switch one or the other signal to an electronic digitizer which measures the frequency of the signal and converts it to a digital number which is stored in one of a plurality of storage cells in a solid state digital memory. clock means are provided for making such digital measurements at selected intervals of time which are preselected prior to lowering the instrument into the borehole. When the instrument is retrieved the data stored in the digital memory are retrieved and the digital values are converted to analog values of the parameters, and are displayed or recorded.

The system of this invention is not limited in the smallest values of pressure and temperature which it can measure, as are the prior art instruments, which depend on mechanically, analog-wise, recording the variation of pressure and temperature by means of a stylus on a moving recording chart. Means are provided for expanding the scale of frequency, in terms of pressure and temperature, so as to make it possible to determine the values of pressure and temperature to greater precision.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENT

Figure 1:
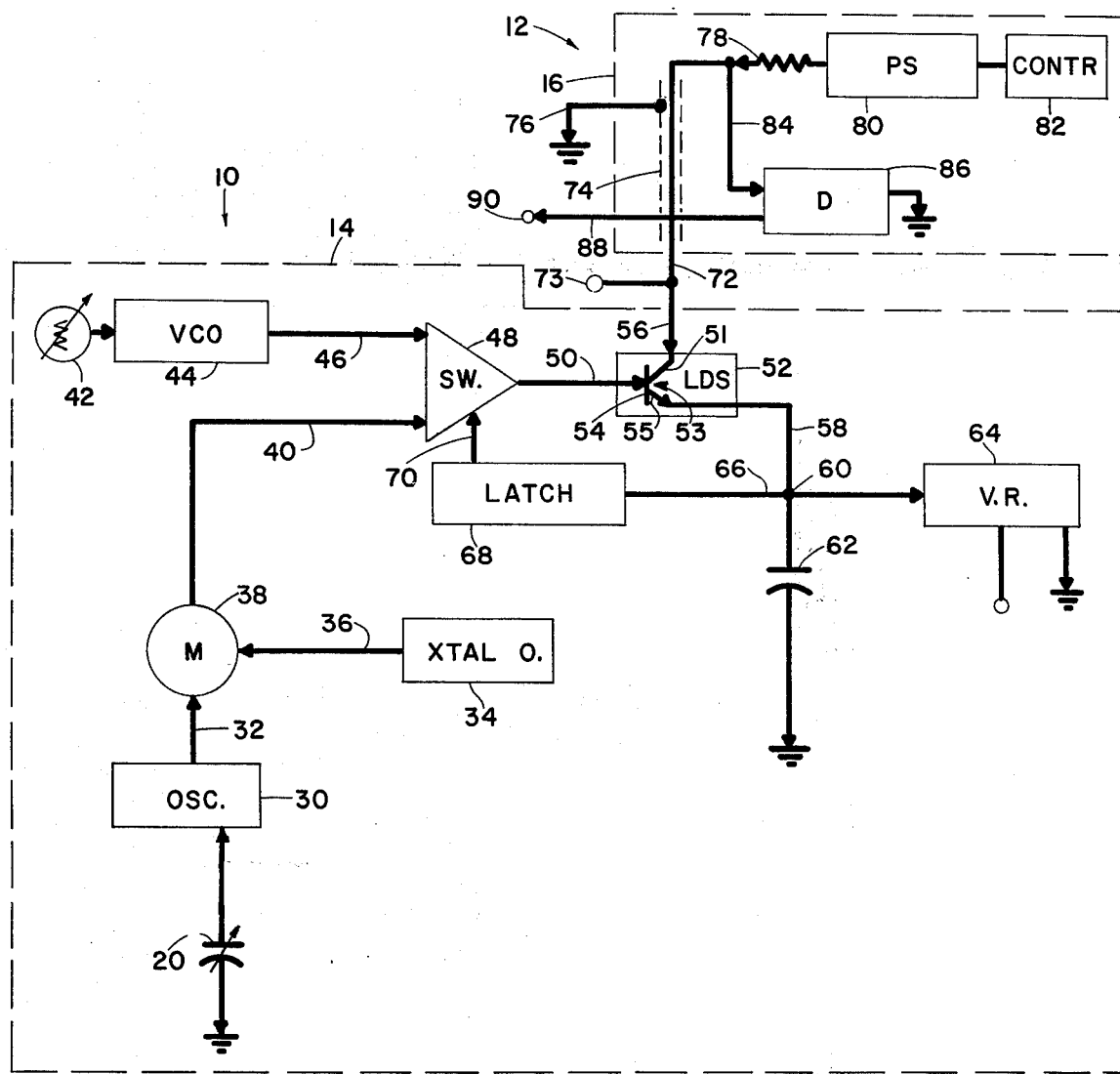
FIG. 1 represents a schematic diagram of the downhole and surface instrumentation.
Figure 4:
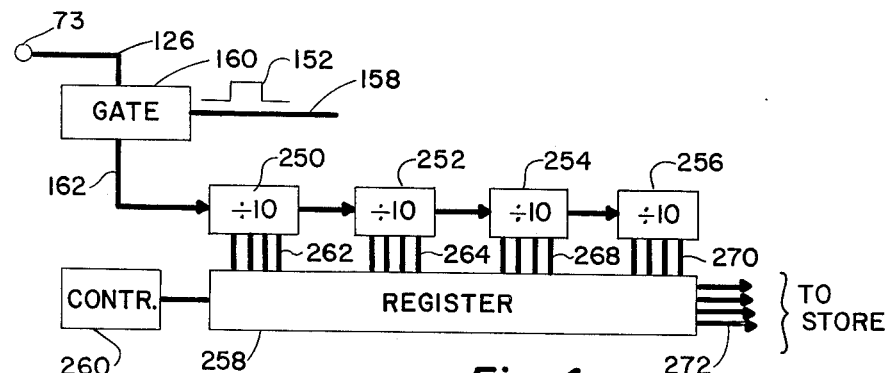
FIG. 4 shows a second embodiment of the digital storage apparatus.

Referring now to the drawings, and particularly to FIG. 1, there is shown a schematic diagram of the logging apparatus which is patterned on FIG. 4 of the application Ser. No. 569,945, which has been entered into this application by reference. There are two portions of the apparatus. Numeral 10 indicates the signal generating apparatus in the downhole instrument, or capsule, or sonde, and numeral 12 indicates generally the surface control apparatus. These are outlined in dashed outlines 14, representing the downhole signal generating apparatus and 16, representing the surface apparatus.

The capacitor 20 forms part of a conventional oscillating circuit in the box labeled 30, and the output frequency of the oscillator goes by lead 32 to a mixer 38. A crystal oscillator 34 is provided within the sonde, and its frequency is set to a selected value. The mixer is a conventional one for providing an output frequency on line 40, which is a function of the frequency difference between the signals of the two oscillators on lines 32 and 36. The purpose of this mixing is to provide a lower output frequency 40, in a different range of frequency, which varies by a greater percentage of the frequency, throughout the range of pressure which is to be measured.

In other words, if the oscillator 30 was used alone the output frequency might vary by plus or minus 5% over the pressure ranges to be recorded. By beating that oscillator 30 with the oscillator 34, the resulting frequency is lower and the frequency shift in cycles being the same, comprises a much larger percentage of the midfrequency, and therefore permits greater sensitivity of measurement than would be the case if the oscillator 30 were used alone.

There is a second oscillator 44, which is a voltage controlled oscillator of conventional design, which is controlled by temperature-sensitive resistor 42, so that the output frequency on line 46, will be a function of temperature within the sonde.

The two leads 46 and 40 go to an electronic switch means 48. By providing a voltage on line 70 which varies in a selected manner, the output line 50 of the switch 48 will be connected selectively to either of the two lines 40 or 46. Thus, the signal on line 50 can be made a signal corresponding to pressure or to temperature, by proper control on line 70. This is controlled by the latch 68 which will be described in more detail in connection with FIG. 2.

Describing this circuit, for the present, in terms of a surface recording system, there is an electrical cable 72, which is a shielded cable, the outer conductor of which 74 is grounded 76. At the surface there is a box labeled 86, which is connected to the central conductor of the cable 72. The box converts the pulsations of frequency on the line 72 to digital values and/or to analog valves for display or processing. The apparatus of box 86 is similar to that which will be described in terms of FIGS. 3, 4 and 5 and so no detail at this time will be given for box 86.

There is a power supply 80 and a control 82. The power supply provides a voltage of approximately 12 volts through a series resistor 78 to the conductor in the cable 72. This conductor in the sonde becomes conductor 56, which goes to a line-drive switch 52. The line-drive switch 52 is essentially a transistor, the base of which 54 is connected to lead 50. The line 56 is connected to the collector 52, and the emitter 55 is connected to line 58, to a capacitor 62, the other side of which is grounded.

The 12 volts applied to the surface end of the conductor 72, goes to the collector 51. The base carries the A.C. potential on the line 50. When this potential goes positive, the base 54 is lifted in potential, and the conductor 72 is connected freely to the capacitor 62. Current flows in the conductor 72 to charge the capacitor 62. When the A.C. potential in line 50 reverses, the base 54 goes negative, and in effect opens the circuit between the conductor 72 and the capacitor and no current flows. Thus there is a square wave of current down the cable. The voltage regulator 64 evens out this fluctuating voltage on the capacitor.

At the surface, the lead 84 connected at the end of the resistor 78 will show a drop of voltage when current flows through the switch 52, and the voltage will rise again when that current stops. Consequently, for each cycle of the A.C. potential on line 50 there will be a corresponding fluctuation of potential down and up on lead 84 to the detector 86. It is this fluctuation in potential on line 84, which is synchronous with the A.C. signal on line 50, which is a measure of the frequency of the signal on line 50, which corresponds to the frequency output of the mixer 38, or the voltage controlled oscillator 44.

Figure 2:
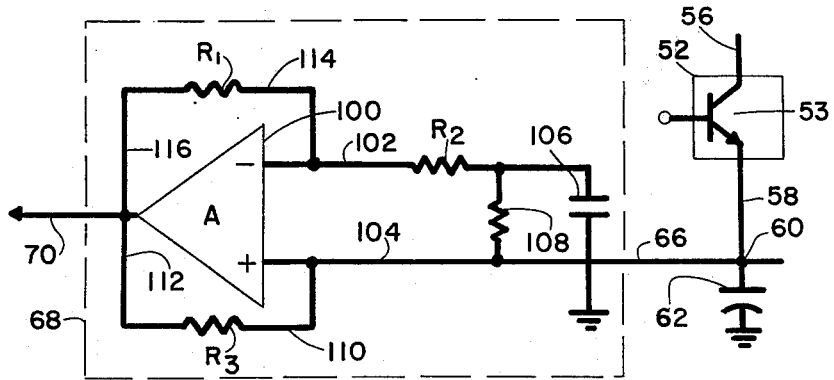
FIG. 2 shows a detail of the latch mechanism of FIG. 1.

Referring now to FIG. 2, the dashed line 68 indicates the latch 68 of FIG. 1. The line 56 goes to the transistor 53 in the switch 52 and the lead 58 goes to the capacitor 62 and the junction 60, then by lead 66 to the latch.

The latch comprises a differential amplifier 100 which has two inputs, a minus input 102 and a plus input 104. The minus input is connected to a resistor R-2 and to a capacitor 106, the other side of which is grounded. There is a resistor 108 between the two lines 102 and 104. Each of the lines is connected to the output line 70 of the amplifier through feedback resistors. The feedback goes from lead 70, by lead 116 to R-1, to lead 114 to lead 102. Also, there is a lead 112 from the output line 70, through resistor R-3 and line 110 to input lead 104.

When there is a short pulse of voltage at point 60 in a plus direction, the amplifier will move the output in that direction and the output will remain positive even though the pulse has been removed from the input lead 60. When the junction point 60 carries a negative short-time pulse the output lead 70 will be lowered in potential and will remain lowered even though the negative pulse has been removed. In other words, the circuit of FIG. 2 acts like a latch. The output moves to a positive or a negative value and holds that value even though the short-time pulse, plus or minus, that caused it has disappeared. The swing of voltage on line 70, plus or minus, controls electronic switches, of conventional nature, in the switch 48 so that lines, 40 or 46, are selectively connected to line 50, until the next variation of potential on point 60 occurs.

The way that the potential at point 60 can be changed is by adding at the power supply 80 a short-time pulse of voltage, of the order of $\theta$ volt plus, or $\theta$ volt minus. When this happens, the junction point 60 goes positive or negative in accordance with the increased voltage applied to the conductor 72. The time constant of the circuit including resistor R-2 and capacitor 106 is different from that of the circuit involving the capacitor 62, so that there will be momentarily a difference of potential between leads 102 and 104. In other words, when point 60 rises in potential, the lead 104 will go more positive but then the differential value will eventually come to almost the same value due to the charging up of the capacitor 106 through the resistor R-2. Again, when the junction drops in voltage, the opposite will happen, so that for a short time, before the circuit readjusts itself, there will be an unbalanced voltage across the input of the amplifier and it will latch into an operating condition where the output is either raised positive or lowered negative.

What has been described is a version of this instrument in which the instrument sonde, as described in application Ser. No. 569,945, is lowered into the borehole on an electrical cable 72 and the control potential and detection of signals are at the surface. However, it is possible to include the essential apparatus of the box 16 at the surface, into the sonde, where the entire control of the apparatus is within the sonde itself.

Figure 3:
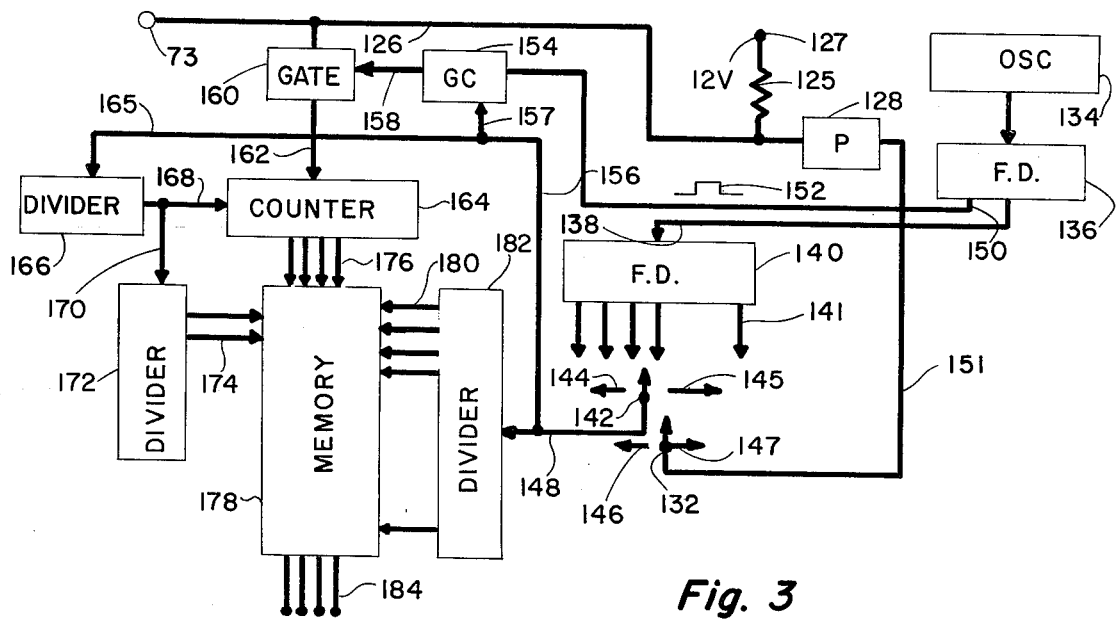
FIG. 3 indicates in schematic form one embodiment of the digital convertor and storage apparatus.

Referring now to FIG. 3, I show one embodiment of the digitizing and storage and control apparatus. The point 73 represents the corresponding point 73 of FIG. 1. It represents the potential on the lead 56. A potential such as 12 volts is applied at 127 to a dropping resistor 125 which is connected to the line 126. Appropriate pulsing means 128 are provided by box 128, which is adapted to place the ¼ volt pulses, plus or minus, under control of lead 151, from switch contact 132, which will be explained further. In other words, the selected time at which the switch 48 is to operate, is determined by the position of the contact 132 in relation to terminals 141 on the divider 140. Appropriate voltage is applied by line 151 to the pulsing device 128, which puts the switching pulse onto the lead 126 which, in effect, puts a pulse on the line 56 of FIG. 1, causing the latch 68 to operate and control the switch 48.

While the instrument is in a constant switched position, one or the other signals on leads 40 or 46 is now going through lead 50 and through the LDS 52 to control the flow of current from the 12 volts at 127, through resistor 125 to the LDS 52, etc. Thus, for each oscillation of the electrical signal reaching point 73, there will be a corresponding pulse applied on lead 126 to a gate 160, the output of the gate going by lead 162 to a counter 164.

The measurement of frequency is done by counting the number of cycles which occur in a selected interval of time. There is an oscillator or clock 134, which has frequency divider 136, of selected ratio, which provides a series of output pulses like 152, of selected time width. The width of the pulse 152 is a selected number of milliseconds or seconds, such that the number of oscillation of the signal on lead 126 which pass through the gate and are counted by counter 164, is a measure of the frequency and, therefore, of the temperature or pressure.

However, such readings of the counter 164 are desired at only certain intervals of time. In other words, it may be decided that the pressure is to be read once in 24 hours, or once in 10 hours, or some other time intervals. Such time intervals are provided by additional frequency dividers 140, and there are a plurality of output terminals 141, which correspond to different time intervals of, let us say, once each 24 hours, once each hour, or once each 10 hours, one each week, etc, by appropriate setting of a switch 142 to the terminals 141, that is, by moving the switch in the direction of the arrows 144 or 145.

There are pulses at certain time intervals placed on the lead 148, which go to 156 and to 157, and controls a gate control 154. When the switch 142 receives a voltage from the divider it enables the gate control 154, and the pulse 152 then passes through the gate control and lead 158 to enable the gate 160. During the time duration of the pulse 152, all oscillations of the point 73 come in, and operate the counter 164. The number of counts of the counter 164 are converted to digital bits on lines 176 and form a series of digital words in the form of a plurality of decimal digits, each one comprising four digital bits. The action of the counter 164 to separate each of the decimal digits is controlled by the divider 166 and lead 168. Furthermore, the digital bits on lines 176, which go into the memory 178, must be switched successively into different addresses in the memory. This is done by means of the divider 172 and leads 174. These take care of the sequential decimal digits, of which there are four for each measurement. The frequency divider 182 applies signals on lines 180 in order to switch the group of sixteen bits signals for sequential measurements into sequential addresses in the solid memory 178.

The memory 178 has output terminals 184, such that when the series of measurements called for by the switching apparatus 140 and contact 142 have been completed, and the sonde has been retrieved to the surface, appropriate signals on leads 180 can sequentially read out from the memory 178, the digital words stored in each of the memory addresses. These digital words can be converted to analog signals for display or for storage or further processing. Such processing forms no part of this invention.

The purpose of the apparatus of FIG. 3, in one embodiment of this invention, is to detect and measure the frequency on one or both of the leads 40 and 46, which correspond to the magnitude of the parameters being recorded, and to convert these frequencies, and to store in a solid state memory the digital bits representative of the frequencies, at each of the intervals of time preselected. These digital bits are then retrieved when the sonde is brought to the surface. The digital words are read out and converted to decimal digits or to analog signals for recording, etc. The combination of the apparatus of the box 14 of FIG. 1 with the apparatus of FIG. 3, therefore, provides a complete and self-contained control and digital recording apparatus for a downhole logging instrument to digitally record the values of pressure or temperature, at pre-selected successive time intervals.

Referring now to FIG. 4, there is shown in another embodiment, the manner in which the frequency of the signal on line 126, which is passed through the gate 160 to lead 162 and to the counter. This embodiment is slightly different from that of FIG. 3. The counter can comprise a group of, say four, counters or dividers 250, 252, 254 and 256. Each of these, let us say, are divide-by-ten dividers or counters. In other words, each of the boxes represents a different decimal digit, of which there are four, so that a maximum recording of up to 9,999 can be made with this apparatus. Each of the decimal counters 250, 252, 254 and 256 has four output leads 262, 264, 268 and 270, which represent four digital bits, which are representative of the decimal digits counted by each of the counters above. All of these go into a register 258 and can be read out in sequence on leads 272 under control 260.

In FIG. 3 there is only one counter 164 which successively acts like the four separate counters of FIG. 4. The outputs are then multiplexed by means of the divider 172 into the memory 178.

Figure 5:
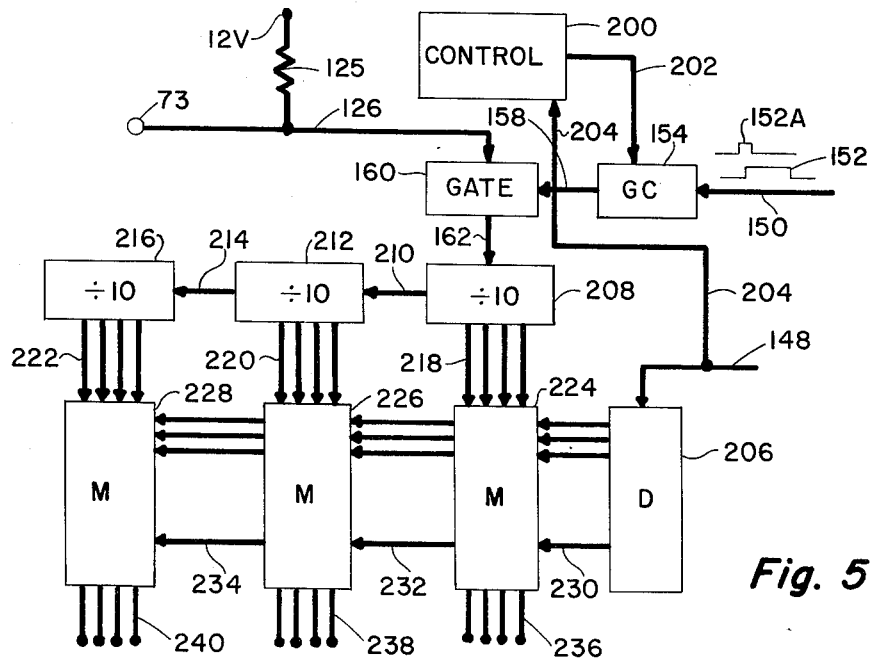
FIG. 5 shows a detail of the digital storage apparatus.

A further embodiment of the apparatus is shown in FIG. 5, which is similar to that of FIG. 3 but combines some of the features of FIG. 4. For example, the potential at 73 goes by lead 126, as in FIG. 3, to gate 160 and to a series of dividers. Divider 208 is connected through lead 210 to divider 212 which is connected through lead 214 to a third divider 216. Each of the dividers are divide-by-ten, and their outputs on leads 218, 220 and 222 are represented by four digital bits, the decimal digits corresponding to the count. The difference between FIG. 5 and FIG. 3 is that the outputs in FIG. 3, of the four decimal digits are multiplexed into storage, whereas in FIG. 5 each of the decimal digits is stored in a separate memory, such as 224, 226 and 228, respectively. The divider 206 corresponds to 182 of FIG. 3, and is controlled by the pulses on lines 148.

While the memory in FIG. 5 and the dividers 208, 212 and 216 shown only three decimal digits there is a manner in which these same three dividers can be used to record to six decimal digits. For example, the lead 150 which goes from the divider 136 and carries the pulse 152 determining the time interval that the gate 160 is opened, is made to provide two different pulses, one of short length 152A and one of long length 152, whereby the long length is, say, a thousand times as long as the short length 152A. When the short length pulse 152A controls the dividers, or counters 208, 212, 216, the total count will be less than 999, which is the maximum that can be counted by the three decimal digit counters 208, 212, 216. The total count then represents the three most significant bits of the count.

Next, when the long pulse 152 is in effect, the length of time of count will be, for example, 1000 times as long, and then the three decimal digits indicated by the counters 208, 212, 216, will represent the least significant bits. The programming of long and short pulses is controlled by box 200, which, responsive to the pulses on lines 148 and 204 counts, or divides, down to control the gate control 154. The box 200 can be set to select, say every fifth or tenth pulse be a short one, to indicate the most significant bits. The others will all show the least significant bits. In this way a three digit counter can be made to indicate to a precision of 6 digits.

As in FIG. 3, the divider 206 controls by leads 230, 232, 234, the placement in the storage memories 224, 226, 228 of the counts of the counters 208, 212 and 216, respectively.

I have used interchangeably the terms divider and counter, since a divider is a counter, which when its count reaches, say 10, it resets itself and starts counting again, in the meantime putting out a pulse which represents 1/10th of the total pulses counted.

While this invention is particularly directed to a downhole sonde for sensing, a digitizing and storing the digital values of one or more parameters, it will be clear that by using apparatus, such as that of FIGS. 3 or 5, at the surface, and connecting the surface apparatus to the sonde by means of a conductor cable, the surface apparatus will then sense and measure the values of the parameters in the borehole. In the surface instruments there would be no need for the memories such as 224, 226, 228, etc. and the output values of the counters 208, 212, 216 could be converted to decimal digits and displayed, or stored, say on tape, for further processing.

The memories such as 224, 226, 228 can be shift registers or similar devices. However, because of the small size of the sonde, required by the conditions of service, and the requirement for self-contained batteries, current drain is a very important factor. Solid state devices generally have quite low current drain. However, in service such as this, where a single series of measurements may take several weeks or months, the total current drain may be more than can be supplied by batteries limited by the available space.

I have found that silicon gate CMOS RAM devices, such as made by Intel, and other manufacturers, provide extremely low current drain and these are preferred for this application.

There is another important factor. The memories are essentially latch devices which require power to be applied at all times in order to maintain the device in its latched state. If the power should fail, then the information stored in the memories would be lost. Furthermore, while the standby current drain is very low, such as 15 nano amperes per bit, when each device operates, the current drain increases to 15–200 micro amperes.

I have therefore provided a monitor in box 200, which normally controls the gate control 154 through lead 202. This monitor has means to frequently check the voltage of the battery. When this drops, for any reasons, to a selected value, which is higher than the minimum required, it stops all measuring and switching activity. The purpose of this is to maintain the system in a standby condition with minimum current drain. This conserves power so that there will be a maximum reserve for holding the memories in operable condition. The control box 200 does this by disabling the gate 160.

While I have shown means, electro-mechanical and/or electronic to switch the recording apparatus to different sensors or to different capacitors, etc. it will be clear that more than two sensors can be provided, or only one can be used. Thus, the latch means 68 and switch means 48 need not be used if a record of only a single parameter is desired.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

We claim:
1. Apparatus for use in deep boreholes in the earth for sensing, digitizing and storing values of physical parameters of the earth, comprising:
   a. a pressure tight housing, and means to position said housing at a selected point in said borehole, and to retrieve said housing;
   b. means to convert a physical parameter in said borehole to an electrical signal of selected characteristic;
   c. means to digitize said electrical signal at successive spaced intervals of time to digital numbers representative of the values of said parameter at said successive times; and
   d. digital storage means in said housing to store said digital numbers.

2. The apparatus as in claim 1 including means at the surface of the earth for reading out of said storage means the digital numbers stored therein, and means to utilize said digital numbers.

3. The apparatus as in claim 1 in which said digital storage means comprises solid state digital storage means.

4. The apparatus as in claim 3 in which said solid state digital storage means comprises digital register means.

5. The apparatus as in claim 1 in which said characteristic of said electrical signal representative of the value of said physical parameter comprises a variable frequency signal, the value of frequency of which corresponds to said value of said parameter.

6. The apparatus as in claim 5 in which said means to digitize said electrical signal to a digital number representative of said physical parameter comprises:
   a. counter means; and
   b. means to connect said electrical signal to said counter for a selected interval of time.

7. The apparatus as in claim 6 including means to count the pulses of said electrical signal, on successive counts, for two different lengths of time.

8. The apparatus as in claim 1 including a plurality of different means to convert the values of a plurality of different parameters to a corresponding plurality of different electrical signals.

9. The apparatus as in claim 8 including means to switch said means to digitize from one to another of said plurality of electrical signals.

10. The apparatus as in claim 9 including means to control said means to switch comprising:
   a. electronic switch means having at least two switches;
   b. latch means to control said electronic switch means; and
   c. means to control said latch means.

11. The apparatus as in claim 10 in which said latch means comprises feedback amplifier means, and means to apply a momentary voltage pulse to said amplifier means.

12. The apparatus as in claim 11 including a preset counter means to determine the length of time before the first sample is recorded, whereby successive samples are taken at equal peselected intervals.

13. The apparatus as in claim 1 in which said means to convert a physical parameter to an electrical signal comprises:
   a. capacitor means comprising two spaced conducting surfaces, one fixed and the other movable;
   b. first oscillator means responsive to the capacitance of said capacitor means;
   c. means to move said movable surface in accordance with said parameter.

14. The apparatus as in claim 13 in which said movable conducting surface is attached to a diaphragm, one side of which is exposed to the hydrostatic pressure in said borehole.

15. The apparatus as in claim 13 including constant frequency second oscillator means, and means to mix the output signals of said first and second oscillator means.

16. The apparatus as in claim 1 in which said means to convert a physical parameter to an electrical signal comprises:
   a. a voltage controlled second oscillator means;
   b. voltage control means to provide a control voltage which is a function of a physical parameter; and
   c. means to control said second oscillator with said control voltage.

17. The apparatus as in claim 1 in which said storage means comprises binary coded decimal means.

18. The apparatus as in claim 17 in which said digitizing means comprises means to sequentially digitize successive decimal values, and means to store said successive values in successive addresses in said storage means.

19. The apparatus as in claim 17 in which said digitizing means comprises means to simultaneously digitize a plurality of decimal values and means to store each of said decimal values in a separate memory.

20. The apparatus as in claim 1 including batteries in said sonde, and means to monitor the voltage of said batteries, and means responsive to said means to monitor to stop all digitizing operations when said voltage drops to a preselected value.

21. The apparatus as in claim 1 in which said means to digitize said electrical signals is at the surface of the earth, and is connected to said means to convert in said sonde, by insulated cable means.

* * * * *